May 17, 1949.　　　　J. E. McCLOSKEY　　　　2,470,179
HOLDING ELEMENT FOR HUB-COLLARS
Filed July 26, 1945
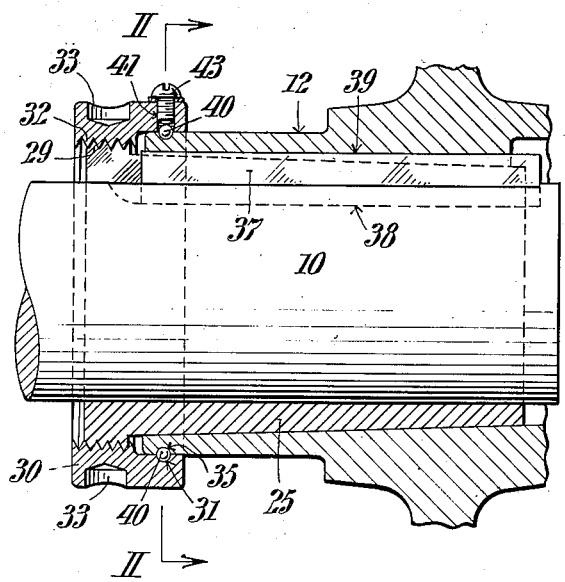
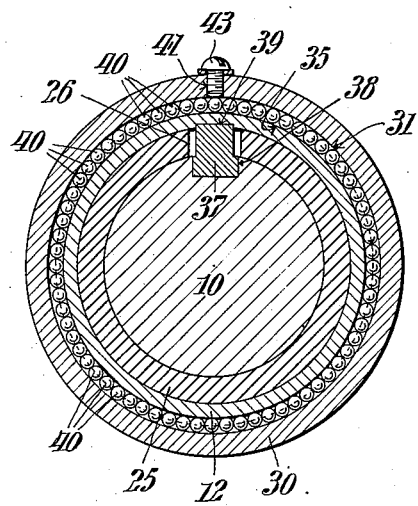
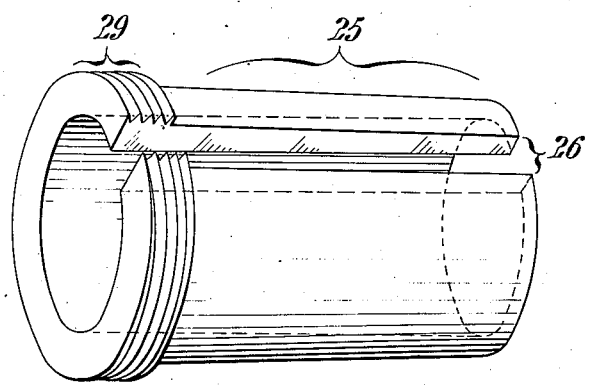
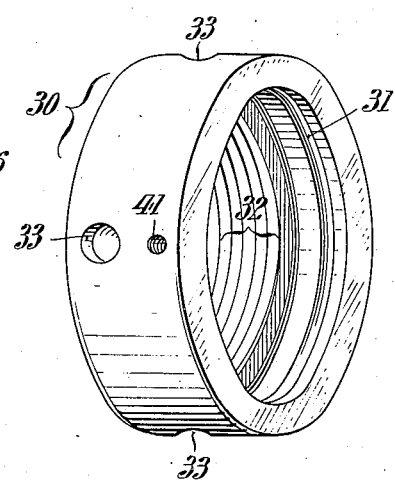
WITNESSES
Anthony Del Viscio
James H. Bell
INVENTOR:
Joseph Ellsworth McCloskey,
BY Paul & Paul
ATTORNEYS.

Patented May 17, 1949

2,470,179

UNITED STATES PATENT OFFICE 2,470,179

HOLDING ELEMENT FOR HUB COLLARS

Joseph Ellsworth McCloskey, Philadelphia, Pa., assignor to The American Pulley Company, Philadelphia, Pa., a corporation of Pennsylvania Application July 26, 1945, Serial No. 607,133

1 Claim. (Cl. 287—52.06)

To facilitate application of the hub of a gearwheel or pulley to its shaft or its removal therefrom, it is customary to interpose a split tapered bushing between the two. A spline may extend through the split of the bushing and be keyed to both shaft and hub. The bushing by its lateral translation tightens or loosens the hub on the shaft. A projecting end of the tapered bushing is threaded and engages an interiorly threaded hub-collar which in turn engages the projecting side of the hub. Rotation of this hub-collar effects lateral translation of the bushing; and in order to accomplish this the hub-collar in addition to its threaded engagement must be held against lateral translation in respect to the hub by a suitable holding element and my present invention has to do with this holding element, and supplies a more effective holding element than those at present used.

In the accompanying drawings

Fig. 1 is a vertical sectional view of the hub of a gear or pulley which is set upon a shaft which is to be driven by the gear or pulley.

Fig. 2 is a sectional view along the lines II—II of Fig. 1.

Fig. 3 is a perspective view of the tapered split bushing interposed between shaft and hub; and Fig. 4 is a perspective view of the hub-collar by which translation of the bushing is effected.

My invention is applicable to the seating of any pulley or gear or similar wheel upon a shaft.

10 is the end of a shaft upon which is held the hub 12 of a pulley or gear wheel, and my invention facilitates its application and removal of the pulley or gear wheel. Between shaft 10 and gear 12 there is interposed a split tapered bushing 25 by lateral translation of which the fitting may be tightened or loosened. A spline 37 engages both a keyway 38 in the shaft and another keyway 39 in the hub 12. This spline, as shown in Fig. 2, passes directly through the split 26 of the bushing 25 but preferably without direct engagement therewith. The projecting end of the bushing 25 is threaded at 29 for engagement with the interior thread 32 of a hub-collar 30 which by its rotation effects translation of the bushing, but in order to accomplish this the hub-collar must itself be in engagement with a holding element which maintains its lateral relation to the hub 12 and my present invention is directed particularly to this holding element.

The projecting side of the hub 25 is provided near its end with an exterior groove 35, and the corresponding inner surface of the hub-collar has an interior groove 31. Into the space provided by the juxtaposition of these two grooves a set of steel balls 40 are laid, for which purpose an aperture 41 is provided in the outer surface of the hub-collar, which aperture when not used for the purpose of inserting or removing the steel balls is closed by a threaded screw 43. When the steel balls are in position they effectively engage the sides of both of the opposing grooves and thereby constitute a holding element preventing lateral translation of the hub-collar 30 in relation to the hub 12, thus holding the hub-collar when rotated to its original plane so that its rotation effects lateral translation of the split bushing. Spanner holes 33 are provided in the circumference of the hub-collar 30 for the ready application of a spanner to effect rotation of the collar.

This holding element may be advantageously used as a means to facilitate the application or removal of a speed reducer to the protruding shaft of a machine which is to be driven through the reducer.

Having thus described my invention, I claim:

Means for holding a rotary part to a shaft which comprises a grooved hub on the rotary part, a split tapered bushing interposed between hub and shaft, the end of the bushing protruding from the hub and being threaded exteriorly of the hub; a grooved hub collar surrounding the protruding end of the bushing threaded interiorly to engage the thread on the protruding end of the bushing; the grooves of the hub collar and the hub being in opposed relation to each other; and holding elements in said grooves consisting of balls seated therein and preventing lateral translation of the hub collar in relation to the hub, whereby rotation of the hub collar effects even lateral translation of the bushing and tightens or loosens the hold of the hub on the shaft according to the direction in which the hub collar is rotated.

JOSEPH ELLSWORTH McCLOSKEY.

REFERENCES CITED

The following references are of record in the file of this patent:

UNITED STATES PATENTS

| Number | Name | Date |
| --- | --- | --- |
| 929,851 | Hess | Aug. 3, 1909 |
| 1,009,729 | Ekeberg et al. | Nov. 28, 1911 |
| 1,762,065 | Lally | June 3, 1930 |
| 1,908,844 | Holtson | May 16, 1933 |

FOREIGN PATENTS

| Number | Country | Date |
| --- | --- | --- |
| 17,310 | Great Britain | 1915 |